United States Patent [19]

Collins

[11] 4,060,577
[45] Nov. 29, 1977

[54] METHOD FOR PRODUCING SEAMLESS FOAM PLASTIC CUPS FROM EXPANDABLE SIDEWALL BLANKS

[75] Inventor: Richard D. Collins, Timonium, Md.

[73] Assignee: Maryland Cup Corporation, Owings Mills, Md.

[21] Appl. No.: 657,184

[22] Filed: Feb. 11, 1976

[51] Int. Cl.² .............................................. B29D 27/00
[52] U.S. Cl. ................... 264/45.4; 229/2.5 R; 264/46.4; 264/51; 264/250; 264/266; 264/288; 264/321; 264/339; 264/DIG. 73; 425/403
[58] Field of Search .................. 264/321, 45.4, 53, 98, 264/339, 51, 250, 46.4, 266, 288, 321, DIG. 73; 425/403; 229/2.5 R

[56] References Cited

U.S. PATENT DOCUMENTS

| 3,374,298 | 3/1968 | Studen | 264/321 X |
|---|---|---|---|
| 3,475,526 | 10/1969 | Seto | 264/321 X |
| 3,493,641 | 2/1970 | Svendsen | 264/98 |
| 3,658,615 | 4/1972 | Amberg | 264/321 X |
| 3,673,033 | 6/1972 | MacDaniel et al. | 264/321 X |
| 3,792,137 | 2/1974 | Seto | 264/46.4 |
| 3,861,847 | 1/1975 | Barnett | 264/339 X |
| 3,917,770 | 11/1975 | Jackson | 264/321 X |
| 3,919,368 | 11/1975 | Seto | 264/53 X |
| 3,931,378 | 1/1976 | Goehring | 264/53 X |
| 3,931,380 | 1/1976 | Belivakici et al. | 264/53 X |
| 3,967,991 | 7/1976 | Shimano et al. | 264/321 X |

Primary Examiner—Philip Anderson
Attorney, Agent, or Firm—Birch, Stewart, Kolasch & Birch

[57] ABSTRACT

Methods and apparatus are provided for producing seamless or apparently seamless plastic foam cups formed from both seamless and seamed sidewall blanks formed by stretching initially cylindrical blank into frusto-conical shapes and then molding such blanks with either expandable foamed plastic beads or foam plastic discs to form an integral cup bottom with the sidewall in an apparently seamless structure. If cylindrical containers are desired, or if frusto-conical sidewall blanks are utilized no stretching is required. Presizing of sidewall thickness prior to treatment in the mold is also provided.

16 Claims, 12 Drawing Figures

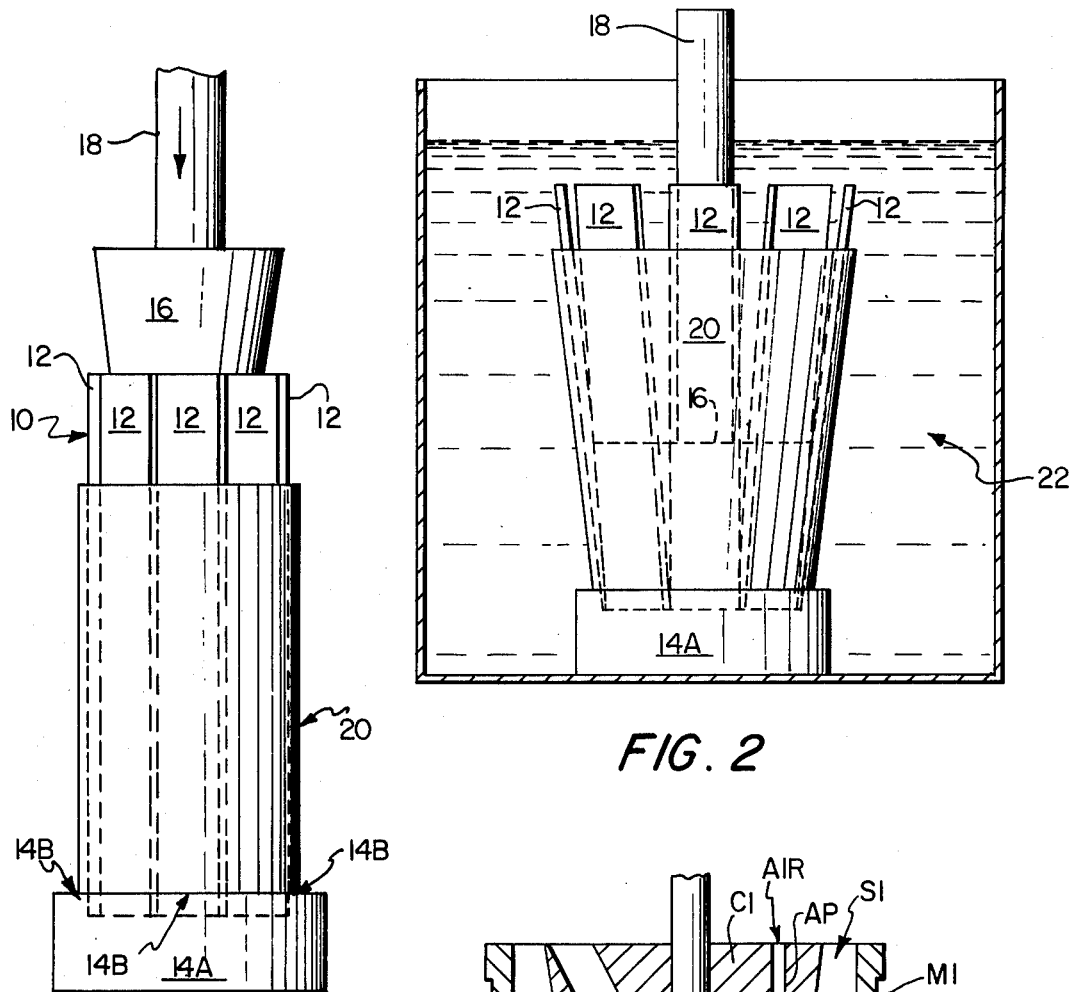
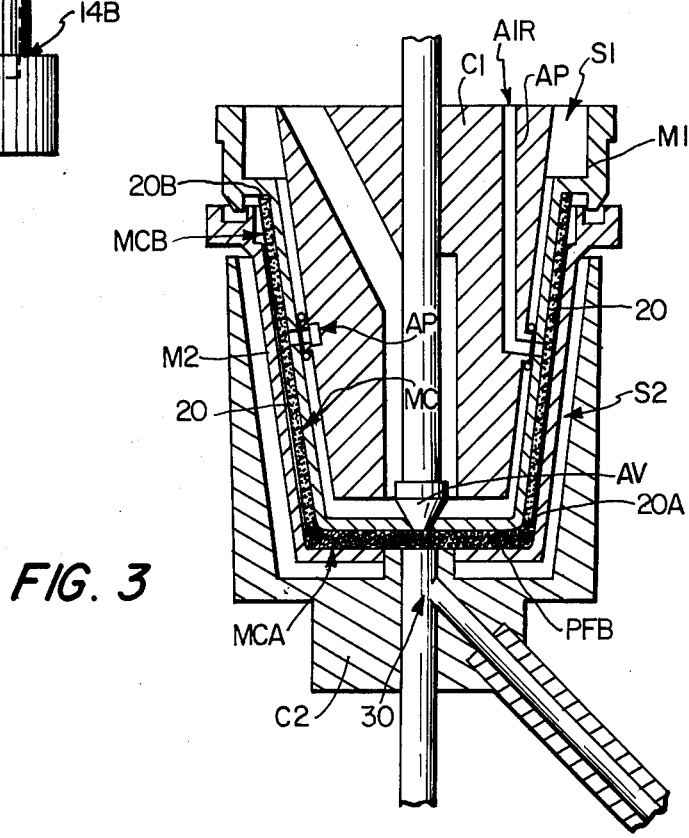
FIG. 1
FIG. 2
FIG. 3

METHOD FOR PRODUCING SEAMLESS FOAM PLASTIC CUPS FROM EXPANDABLE SIDEWALL BLANKS

FIELD OF THE INVENTION

This invention relates to the fabrication of plastic containers and more particularly to foam plastic containers wherein at least the sidewall portion is fabricated from extruded foam plastic.

BACKGROUND OF THE INVENTION

In order to produce a cup from extruded foam plastic sheet, it is necessary to cut foamed sheet into either arcuate cup blanks and form the cup sidewalls in a manner known for paper cups and containers or to orient the extruded foam sheet, cut it into rectangular strips, form side-seamed cylinders from the strips and shrink the cylinders to the desired frusto-conical shapes.

Both methods result in the further necessity of heat or solvent sealing a bottom piece to the lowermost portion of the sidewalls.

OBJECTS OF THE INVENTION

It is an object of the present invention to provide a frusto-conical cup or container sidewall which is stretch-formed from a preformed cylindrical shape.

Another object of the present invention is to provide a frusto-conical seamless sidewall for cups and containers from extruded foam plastic cylinders.

Still another object of the present invention is to provide a container having a stretch-formed frusto-conical sidewall and a molded bottom.

Yet another object of the present invention is to provide a new and novel method for making foam plastic containers. These and other objects of the present invention will become more fully apparent with reference to the following specification and drawings which relate to a preferred embodiment of the invention.

SUMMARY OF THE INVENTION

In a preferred embodiment of the present invention an extruded polystyrene foam cylinder is made in a continuous manner and cut into lengths equal to the ultimate height of a desired cup or container.

The precut cylinder is then placed over a cylindrical mandrel consisting of a plurality of pivoted arcuate leaves, for example, eight (8) in number, defining the periphery of the cylinder and the entire mandrel and sleeve are placed in a water bath or the like, thus creating an environment in which the sleeve can be heated to a temperature of from 195° to 220° Fahrenheit.

When the desired temperature of the sleeve is achieved, a tapered plug is forced into the free end of the array of pivoted arcuate leaves whereby the leaves are forced outward to define a frusto-conical mandrel and force the heated polystyrene sleeve to assume, by stretching, a frusto-conical shape.

The resulting frusto-conical sleeve is stripped from the mandrel and transferred into the mold cavity of an expanded polystyrene bead cup or container mold then, into the bottom forming portion of the mold, a measure of expandable polystyrene beads are fed.

Then, steam is applied to the mold to expand and fuse the beads to form a molded integral bottom with the stretch formed sidewall and the sidewall is thus post treated and expanded to fill the mold cavity and generate a top bead shape, a smooth skin and good thermal qualities for use with hot beverages, foods and the like.

A similar end product can also be made using a foam sheet disc as the bottom of the cup. The use of the steam in a mold will cause the disc and sidewall to expand and fuse the disc to the bottom of the sidewall.

Also, a cylinder may first be formed from a rectangular blank of foam sheet material by lap seaming on a mandrel or form with heat or solvent and then stretch forming the seamed cylinder to a frusto-conical shape. Then, the formed seamed cylinder is molded with either expandable beads or a foam disc in a steam mold to form a smooth-sided unitary foam container.

BRIEF DESCRIPTION OF THE DRAWINGS

FIG. 1 is a schematic diagram in side elevation of an expanding mandrel and expandable polystyrene foam sleeve of the present invention prior to expansion of the mandrel and sleeve;

FIG. 2 is a schematic of the mandrel and sleeve of FIG. 1 in an expanded condition in a heating bath which has softened the sleeve to permit expansion;

FIG. 3 is a cross-section of an expanded sleeve, steam heated cup mold containing the sleeve and polystyrene foam beads in the mold cavity for forming a bottom on the expanded sleeve;

DETAILED DESCRIPTION OF THE DRAWINGS

Figure 4:
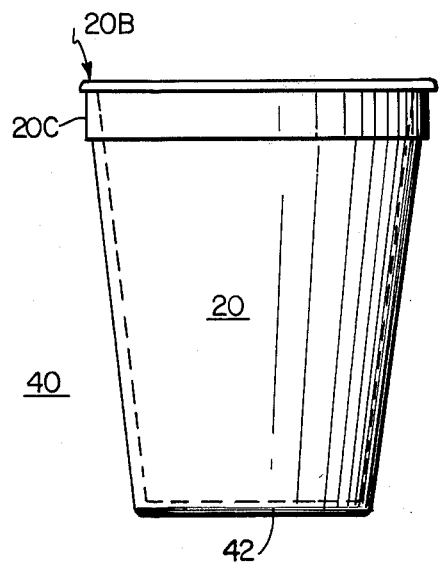
FIG. 4 is a side elevation of a finished seamless container of the present invention.
Figure 8:
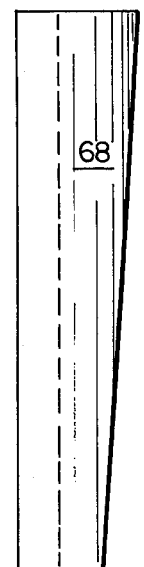
FIG. 8 is a top plan view of FIG. 7.
Figure 8:
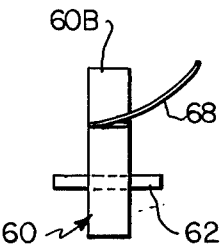
Figure 7:
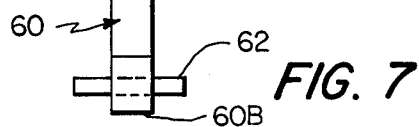
FIG. 7 is a detailed showing of a mandrel vane of the present invention in front plan.

Referring in detail to the drawings and with particular reference to FIG. 1, a cylindrical mandrel 10 is shown as being comprised of eight elongated arcuate leaves 12, each of which subtend an angle of 45° about the circumference of the mandrel 10.

Each of the leaves 12 is pivoted on a base 14A at a point 14B adjacent the lowermost extremity thereof, as shown, such that a tapered plug 16 forced into the interior of the mandrel 10 by a suitable shaft 18 will cause the arcuate leaves 12 to assume a position defining a frusto-conical cage or "peach basket" shape such as illustrated in FIG. 2.

The arcuate leaves 12 are biased inwardly to the position shown in FIG. 1 by any suitable means and define in their innermost position, a cylinder of a diameter of a thermoplastic sleeve 18 preferably of extruded polystyrene foam or the like.

With the thermoplastic sleeve 20 in place, the mandrel 10 is immersed in a heated water bath 22 or other heated environment which will heat the thermoplastic sleeve to a uniform temperature at which it may be increased in diameter without rupturing.

In the case of polystyrene foam, a water temperature of 195° to 225° Fahrenheit will produce the desired result. For example, sleeves of polystyrene foam having a wall thickness of 0.025 inches are heated to this temperature, the tapered plug 16 is driven into the mandrel 10 by the shaft 18, causing the arcuate leaves 12 to fan out into the previously described frusto-conical or "peach basket" shape, thereby stretching the cylindrical sleeve 20 out into a frusto-conical surface open at both ends.

Further, by controlling the time of heating or immersion in the water bath 22 in the preferred embodiment as well as the temperature, the ultimate wall thickness of the conical sleeve 20 can either be maintained, thinned at the large end or increased.

Example 1:

An extruded polystyrene foam sleeve 20 having a wall thickness of 0.025 inches is preheated to a temperature of 205°–210° F prior to applying stretching forces thereto for tapering the sleeve. As a result, post expansion of the foam sleeves takes place increasing the wall thickness to 0.050 inches. Now as the sleeve 20 is stretched to a frusto-conical shape, the wall thickness will vary from 0.050 inches at the small end to approximately 0.040 inches at the large end.

Example 2:

An extruded polystyrene sleeve 20 having a wall thickness of 0.025 inches is preheated in the bath 22 to a temperature of 190°–195° F and then subjected to stretching. At this temperature, post expansion does not occur prior to stretching. Therefore, after stretch forming, the wall thickness has been tapered from 0.025 inches at the small end of the sleeve 20 to 0.015 inches at the large end thereof.

Since the temperature rise within the foam sleeve 20 is a function of time of exposure to the heating bath 22, the foregoing examples illustrate that control of the time of immersion or exposure of the sleeve 20 to a heating medium such as the bath 22, before stretch forming, can be used to control the wall thickness of the stretched tubular product.

Subsequent cooking in a mold can thereby vary or control the wall thickness as well.

In the case of polystyrene foam, a water temperature of 195° to 225° Fahrenheit will produce the desired result. For example, sleeves of polystyrene foam having a wall thickness of 0.025 inches are heated to this temperature and the tapered plug 16 is driven into the mandrel 10 by the shaft 18, causing the arcuate leaves 12 to fan out into the previously described frusto-conical or "peach basket" shape, thereby stretching the cylindrical sleeve 20 out into a frusto-conical surface open at both ends.

Further, by controlling the time of heating or immersion in the water bath 22 in the preferred embodiment as well as the temperature, the ultimate wall thickness of the conical sleeve 20 can either be maintained, thinned at the large end or increased.

Once the cylindrical sleeve 20 has been stretched or expanded into a frusto-conical shape it is necessary to form a bottom portion at the narrow end thereof in order to form a cup or container with the expanded sleeve 20 as the sidewall portion thereof.

In a preferred embodiment of the invention in which a foam plastic drinking cup having no seams is the ultimate desired container, reference will now be made to FIG. 3 which the final forming steps in the process are illustrated.

The frusto-conical sleeve 20 is placed in a steam-heated mold cavity MC defined by male and female mold members M1 and M2 surrounded, respectively, by steam jackets S1 and S2 in internal and external core members C1 and C2, respectively.

The lower edge 20A, the smaller end of the frusto-conical sidewall 20, is positioned adjacent the bottom forming portion MCA of the mold cavity MC, which bottom forming portion MCA is filled with expandable polystyrene foam beads PFB in a measured amount sufficient to expand to form a cup bottom and seal the latter to the lower edge 20A of the sidewall 20 to form a seamless final product 40 as illustrated in FIG. 4.

The beads PFB are introduced into the lower mold cavity portion MCA by a conventional charging arrangement generally illustrated at 30.

When the finished cup 40 is to be ejected from the mold, compressed air may be introduced against the bottom of the cup through bead charging valve 30 to blow the finished cup from the mold. Additional air is introduced through air ports AP in the male mold core C1 against the interior of the foam cup sidewalls.

Cup molds for forming cups and containers from measured quantities of expandable polystyrene foam beads are well known in the art. Exemplary prior art patents are U.S. Pat. No. 3,125,780 of Harrison et al for Apparatus and Method for Making Plastic Containers, issued Mar. 24, 1964 and U.S. Pat. No. 3,700,175 of Harrison for Method of Making Cups, issued Aug. 10, 1965.

The polystyrene beads PFB are injected into the lower mold cavity MCA via the charging means 30 in a predetermined quantity and then the steam jackets S1 and S2 are supplied with steam from a suitable source or sources. The valve AV introduces steam directly into the lower mold cavity MCA.

The heat from the steam jackets S1 and S2 causes the beads PFB to expand and fuse to form a solid cup bottom 22 as shown in FIG. 4 which is fully integrated with the sidewall 20 to the extent that the lower edge 20A of the latter has disappeared and the finished cup 40 is seamless.

The upper edge 20B of the sidewall 20 is seated in the uppermost portion MCB of the mold cavity MC, the said uppermost portion MCB being formed in the shape of an ultimately desired cup rim or lip 20C as illustrated in FIG. 4.

When the steam heat is applied to the steam jackets S1 and S2 to the mold cores C1 and C2 and mold parts M1 and M2, the sidewall 20 expands to snugly fill the entire mold cavity MC and take the shape of the upper mold cavity MCB to thereby produce the lip or bead portion 20C on the ultimate seamless cup or container 40.

Where other shapes are desired for the sidewall, such as in the case of a foam plastic can rather than a cup, the mold cavity MC need merely be made of the appropriate conformation to receive a formed or natural state foam blank to which a bottom portion will be attached by the known process of fusing expandable plastic foam beads. In all of the frusto-conical, cylindrical and other shapes which might be selected, the foam sidewall blank is post treated in the mold to materially enhance such characteristics as toughness, smooth external and internal skins and the like.

With cylindrical blanks and a final cylindrical shape there is no need to utilize the water bath and expansion apparatus as when a frusto-conical sidewall is desired.

In summary, the present invention provides new and novel methods for manufacturing seamless foam containers having frusto-conical, cylindrical or other sidewall blanks with a fused expanded foam bead bottom wall.

Referring now to FIGS. 5, 6, 7 and 8 and alternate embodiment of heating and stretching apparatus 50 is shown as including a base portion 52 having an upstanding cylindrical heater tube 54 mounted therein, the latter including a cartridge type electric heating element 56 connected by suitable power leads 56A, 56B to a suitable source of electric power not shown.

Externally concentric with the base of the heater tube 54 and recessed within the base 52 is an actuating ring 58 which is coaxially reciprocable along the tube 54 and in an annular recess 52A in the base 52.

Figure 5:
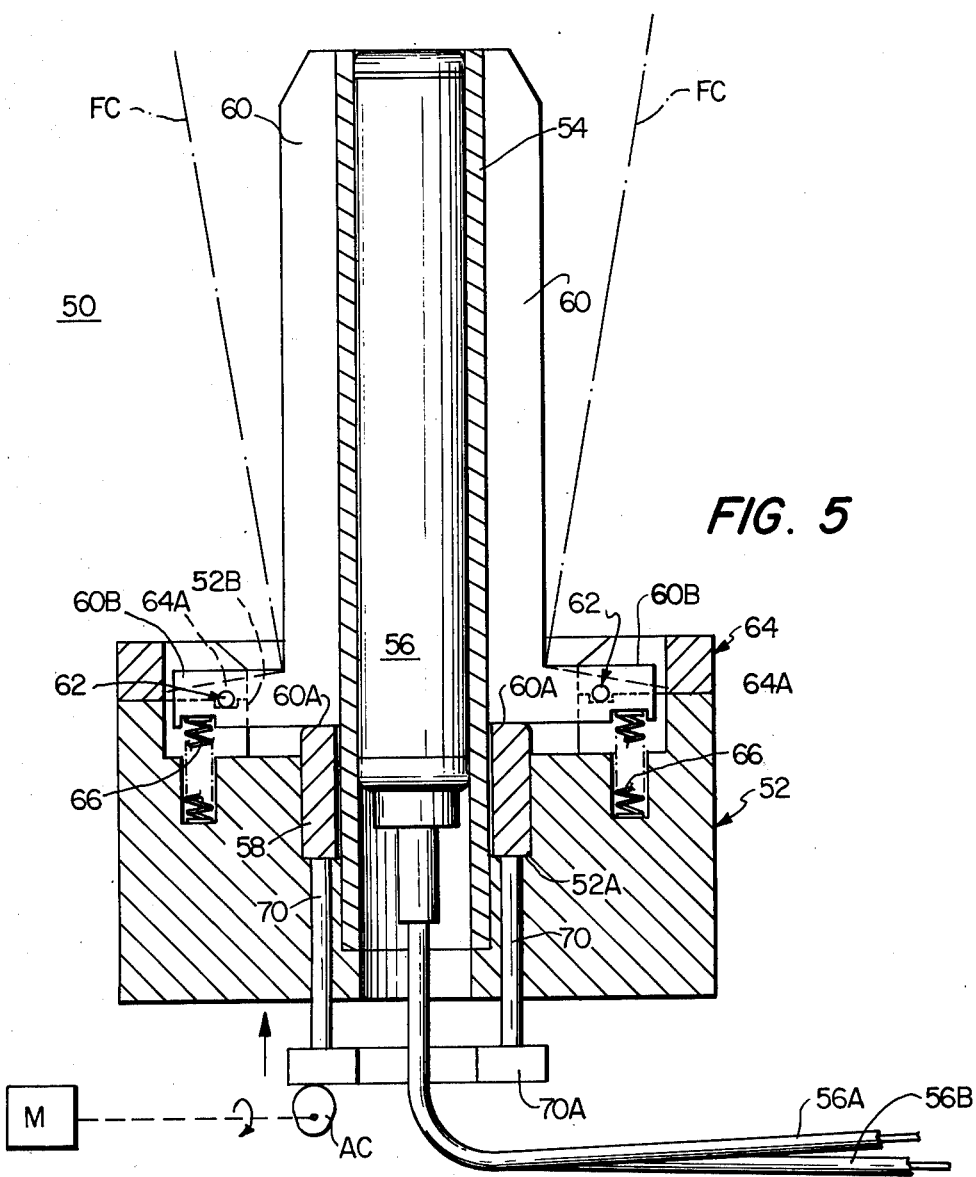
FIG. 5 is a side elevation of a heating and forming mandrel of the present invention.

A plurality of L-shaped levers 60 are provided in vertical planes extending radially outward from the heater tube 54, with the outer right angle bends 60A thereof bearing on the upper end of the actuating ring 58 as best shown in FIG. 5.

The lower arms 60B of the levers 60 are mounted intermediate their ends on pivot pins 62 held in place across cords of a circle concentric with the heater tube 54 by means of a toothed clamping ring 64 having teeth 64A cooperating with bosses 52B in the base 52 to clamp the pivot pins 62 in place.

A suitable return spring assembly 66 is provided beneath the outermost ends of the lower arms 60B of the levers 60 to bias the upstanding arms portions thereof radially inward about the pivot pins 62 and into engagement with the heater tube 54, thereby constraining the pivoted levers 60 to follow the reciprocations of the actuating ring 58 under the influence of the return spring 66.

Figure 6:
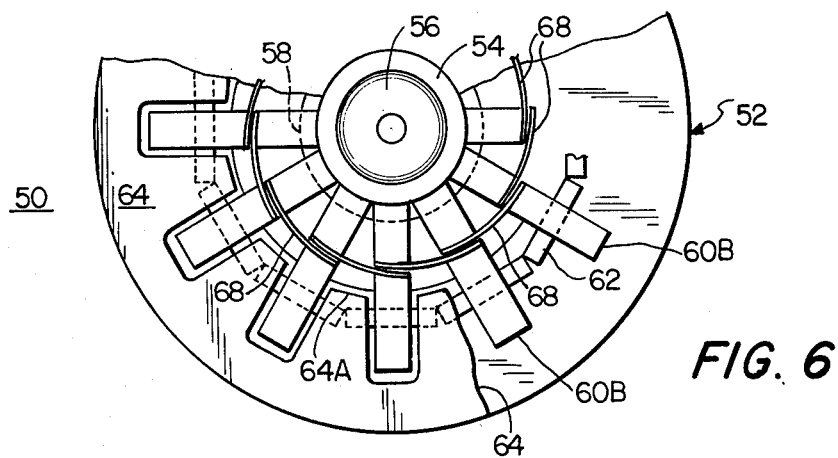
FIG. 6 is a top plan view of FIG. 5.

The upstanding arms of the L-shaped levers 60 carry vertically tapered arcuate leaves 68 which mutually overlap adjacent leaves (the adjacent leaf clockwise about the heater tube 54 as shown in FIG. 6) in the provision of an expanding mandrel which goes from the cylindrical slope illustrated in FIG. 6 to a frusto-conical shape when the vertical arms of the levers 60 and the arcuate leaves 68 are moved to their maximum radial distance from the heater tube 54 as shown by phantom lines FC in FIG. 5.

The expansion of the mandrel assembly 50 is effected by means of actuating pins 70 extending upward through the base 52 of the mandrel assembly 50 from an actuating plate 70A into engagement with the actuating ring 58.

A motorized actuating cam AC driven by a motor M is used to cycle the actuating plate 70A.

Alternatively, of course, the cam AC can be a fixed cam track and the entire mandrel assembly 50 can be mobile with respect thereto.

In operation, a cylindrical foam sleeve of a desired length is telescoped externally over the arcuate leaves 68 in the closed position of FIG. 6, the heater 56 is energized either previously or subsequently to heat the sleeve and the heating tube 54 and after a predetermined time period resulting in a known temperature of the sleeve, the cam AC raises the actuating plate 70A, actuating pins 70 and actuating ring 58, causing the levers 60 to rock about the pivot pins 62 and drive the arcuate leaves 68 toward the position FC of FIG. 5, thereby stretching the heated cylindrical foam sleeve to a frusto-conical shape.

The return of the cam AC to a non-actuated position and the action of the return spring 66 on the lever arms 60B returns to leaves 68 to their closed cylindrical configuration of FIG. 6. This permits ready removal of the now frusto-conical sleeve from the mandrel assembly 50 for transfer to the mold cavity MC of FIG. 3.

Figure 9:
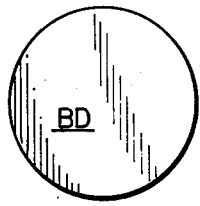
FIG. 9 is a top plan view of a bottom disc of the present invention.
Figure 10:
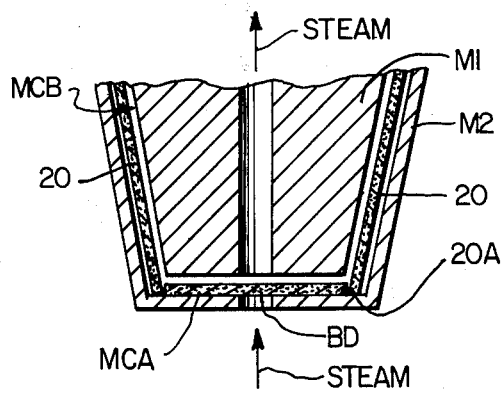
FIG. 10 is a schematic side elevation in cross-section of a bottom disc being molded into a cup.

Referring now to FIGS. 9 and 10, an alternate embodiment of foam cup and method of making same is schematically illustrated.

Instead of using expandable plastic foam beads, the bottom of the cup of the present invention can be fabricated from a disc BD of foam sheet material.

The disc BD is placed in the lowermost cavity MCA of the mold between the male and female mold members M1 and M2, respectively, either before or after the frusto-conical stretched sleeve 20 is inserted in the upper mold cavity MCB.

In the embodiment shown in FIG. 10, the disc BD is of slightly lesser diameter than the small end of the formed sleeve 20, thereby permitting the sleeve 20 to be first placed in the mold cavity and the bottom disc BD to be placed in the cavity through the interior of the formed sleeve 20 before the male mold portion is inserted.

Then, when the mold is closed and steam is supplied, the bottom disc BD and the lowermost portions 20A of the cup sidewall will expand and fuse to form an integral cup structure.

Figure 11:
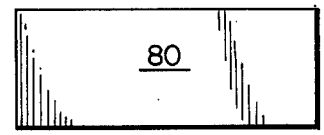
FIG. 11 is a top plan view of a rectangular foam blank.
Figure 12:
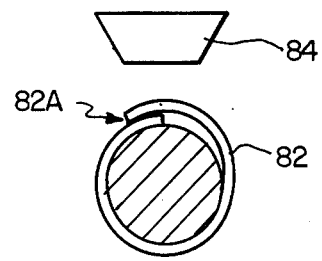
FIG. 12 is a schematic showing of the foam blank of FIG. 11 being formed into a cylinder.

As shown in FIGS. 11 and 12, a further alternate embodiment for use with either fused beads PFB or a disc BD for a bottom portion, a rectangular blank 80 of foam sheet material is fabricated into a cylinder 82 by folding or wrapping on its long dimension on a mandrel or other suitable form to cause the opposite ends of the rectangular blank to overlap and then either heat sealing with an iron 84 or otherwise affixing the ends in a lap seam 82A.

The cylinders 82 can then be stretch-formed in the manner disclosed for the extruded seamless tubes 20 and subsequently steam fused and thus, post treated in molds as previously described.

The lap seam 82A will be of the same thickness as the remainder of the sidewall of the finished cup product because of the expansion of the sidewalls of the formed cylinder 82 to fill the mold cavity.

Utilization of this expansion phenomenon to effect a smooth side seam in a frusto-conical cup is disclosed in U.S. Pat. No. 3,312,383 issued Apr. 4, 1967 to Arnold Shapiro et al, for Plastic Container.

The teachings of the present invention can also be applied to cups made from conventionally shaped foam sheet sidewall blanks as shown in the above-identified patent of Shapiro et al, by effecting all seaming of the sidewall and/or the bottom blank by the heat in the mold, thereby eliminating the need for solvent or adhesive sealing thereof. Also, the use of foam beads to form a seamless bottom on such sidewalls is clearly contemplated.

The present invention may be modified as would occur to one of ordinary skill in the art without departing from the spirit and scope of the present invention.

What is claimed:

1. The method of forming a smooth-sided foam plastic container from a expandable foam plastic cylinder comprising the steps of:
   placing said expandable foam cylinder on a mandrel and heating said cylinder to a desired temperature over a desired interval to initially size the wall thickness thereof;

removing said cylinder from said mandrel and inserting same in the mold cavity of a steam heated expandable foam plastic bead container mold of a substantially conformal interior shape;

injecting expandable foam plastic beads into one end of said mold; and heating said mold to cause said beads to expand and mutually fuse with themselves and one edge of said cylinder to form a container bottom which is seamlessly integrated with said cylinder to provide a seamless foam container.

2. The invention defined in claim 1, wherein said mold is heated to a sufficient level to cause said expandable foam cylinder to expand and assume the interior conformation of the mold cavity.

3. The method of making a smooth-sided frusto-conical foam plastic container from a cylindrical expandable foam plastic sidewall blank comprising:

heating said cylindrical expandable plastic foam sidewall blank and stretching said blank while heated to a frusto-conical shape;

permitting said frusto-conical blank to set and placing said blank in a frusto-conical mold cavity;

injecting a plurality of expandable plastic foam beads into said cavity adjacent to the smallest end of said frusto-conical blank; and heating said mold to expand said blank and expand and fuse said beads into a container bottom seamlessly integrated with said conical blank.

4. The method of claim 3, wherein said mold cavity defines a wall thickness in excess of that of said conical blank; and wherein said mold is heated sufficiently to expand said blank to assume the interior dimensions of said mold cavity.

5. The method of claim 4, wherein said mold cavity includes a top bead defining annulus at the upper end thereof and;

wherein said blank is expanded to fill said annulus and provide a top bead about the open end of the finished product.

6. In a method of forming a smooth-sided foam plastic container from a preformed expandable foam plastic sidewall blank open at both ends and a charge of expandable thermoplastic beads including:

placing said sidewall blank in a conformally shaped mold cavity which includes a container bottom defining portion;

filling said bottom defining portion of said mold cavity with expandable foam plastic beads; and applying heat to said mold cavity to expand said beads into a fused bottom portion of said container seamlessly joined with said sidewall blank;

the improvement comprising:

first forming an expandable foam cylinder from a rectangular blank of expandable foam sheet material wrapped upon itself and joined in a lapped side seam;

heating said cylinder; and stretch forming said cylinder to a desired shape to provide said preformed sidewall blank.

7. The invention defined in claim 6, wherein said mold cavity defines a wall thickness in excess of that of said blank; and wherein said mold is heated sufficiently to expand said blank to assume the interior dimensions of said mold cavity.

8. The invention defined in claim 7, wherein said mold cavity includes a top bead defining annulus at the upper end thereof and;

wherein said blank is expanded to fill said annulus and provide a top bead about the open end of the finished product.

9. The forming of a smooth-sided foam plastic container from an expandable preformed expandable foam plastic tubular sidewall blank open at both ends comprising:

placing said sidewall blank in a conformally shaped mold cavity which includes a container bottom defining portion;

placing a disc of expandable foam sheet material of generally conformal shape to said bottom defining portion in the latter; and applying heat to said mold cavity to expand said disc and said sidewall portion into a fused integral cup structure.

10. The invention defined in claim 9, wherein said mold cavity defines a wall thickness in excess of that of said blank; and wherein said mold is heated sufficiently to expand said blank to assume the interior dimensions of said mold cavity.

11. The invention defined in claim 10, wherein said mold cavity includes a top bead defining annulus at the upper end thereof and;

wherein said blank is expanded to fill said annulus and provide a top bead about the open end of the finished product.

12. The method of forming a smooth-sided foam plastic container from a foam plastic cylinder comprising the steps of:

placing a foam cylinder on a mandrel and heating said cylinder to a desired temperature over a desired time interval to initially size the wall thickness thereof;

removing said cylinder from said mandrel and inserting same in the mold cavity of a steam heated expandable foam plastic bead container mold of a substantially conformal interior shape;

placing a disc of expandable foam sheet material of substantially the same diametric proportions as said cylinder into one end of said mold; and heating said mold to cause said cylinder and said disc to expand and fuse into an integral container structure.

13. The invention defined in claim 12, wherein said mold is heated to a sufficient level to cause said foam cylinder to expand and assume the interior conformation of the mold cavity.

14. The method of making a smooth-sided frusto-conical foam plastic container from a cylindrical expandable foam plastic blank and an expandable foam plastic disc comprising:

heating said cylindrical plastic blank and stretching said blank while heated to a frusto-conical shape;

permitting said frusto-conical blank to set and placing said blank in a frusto-conical mold cavity;

placing said disc of expandable plastic foam sheet material into said cavity adjacent to and substantially entirely across the smallest end of said frusto-conical blank; and heating said mold to expand and fuse said disc and said blank into an integral container structure.

15. The invention defined in claim 14, wherein said mold cavity defines a wall thickness in excess of that of said conical blank; and wherein said mold is heated sufficiently to expand said blank to assume the interior dimensions of said mold cavity.

16. The invention defined in claim 15, wherein said mold cavity includes a top bead defining annulus at the upper end thereof and;

wherein said blank is expanded to fill said annulus and provide a top bead about the open end of the finished product.

* * * * *